Figure 1:
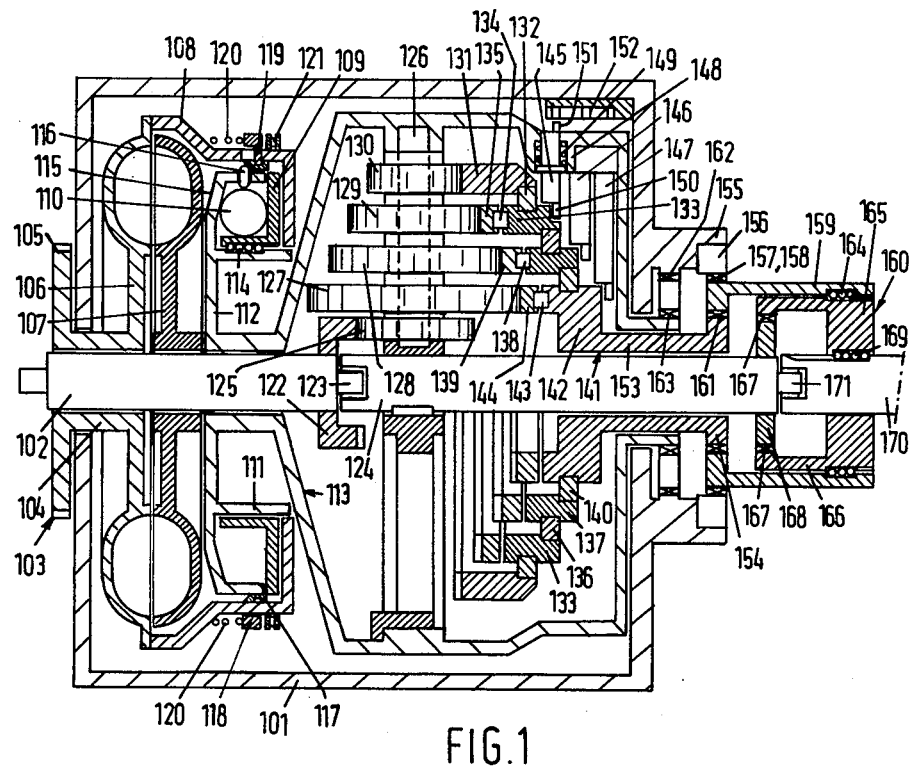

United States Patent [19]

Van Doorne, deceased

[11] Patent Number: 4,464,954

[45] Date of Patent: Aug. 14, 1984

[54] AUTOMATIC TRANSMISSION

[75] Inventor: Hubertus J. Van Doorne, deceased, late of Deurne, Netherlands, van Doorne, Heir; by Martinus P. J. H.

[73] Assignee: Erven Dr. Hubertus Josephus van Doorne, Eindhoven, Netherlands

[21] Appl. No.: 303,129

[22] Filed: Sep. 13, 1981

[51] Int. Cl.³ .................. F16H 3/74; F16H 37/06; F16H 3/44

[52] U.S. Cl. .................... 74/752 E; 74/705; 74/773

[58] Field of Search ............. 74/677, 687, 773, 752 E, 74/752 B, 768, 769, 785, 750 R, 705

[56] References Cited

U.S. PATENT DOCUMENTS

| | | | |
|---|---|---|---|
| 1,775,741 | 9/1930 | Thomas | 74/752 B |
| 2,218,813 | 10/1940 | Cotterman | 74/752 E |
| 2,221,092 | 11/1940 | Hale | 74/789 |
| 2,926,552 | 3/1960 | Wallach | 74/773 |
| 2,959,072 | 11/1960 | Wallach | 74/773 |
| 3,985,238 | 10/1976 | Nakura et al. | 74/750 R |

*Primary Examiner*—Allan D. Herrmann
*Assistant Examiner*—Bruce F. Wojciechowski
*Attorney, Agent, or Firm*—Weingarten, Schurgin, Gagnebin & Hayes

[57] ABSTRACT

An automatic transmission with a section controlling the transmission ratio between an input shaft and an output shaft. The section comprises a central shaft carrying at least one radially extending shaft with a first set of gear wheels drivable by the input shaft. Depending on the desired torque-speed ratio, the gear wheels can cooperate with a second set of gear wheels which in a torque-dependent fashion are spring-loaded so as to be locked from rotation. The direction of rotation of the output shaft can be reversed with an adjusting mechanism.

11 Claims, 2 Drawing Figures

AUTOMATIC TRANSMISSION

This invention relates to an automatic transmission in a driving arrangement further comprising a motor and a shaft to be driven, the task of the automatic transmission being to adjust the torque supplied by the motor to the torque required at the driven shaft.

For this purpose the automatic transmission according to the invention comprises a speed-dependent clutch, a section cooperating with said clutch for controlling the transmission ratio between input shaft and output shaft, said section comprising a central shaft carrying at least one radially extending shaft with a plurality of gear wheels mounted on each radial shaft so as to be restrained from rotation relative thereto, said gear wheels being drivable by the input shaft and each having a different pitch circle, said gear wheels being capable, depending on the desired torque-speed ratio, of cooperating with a plurality of corresponding gear wheels which in a torque-dependent fashion are spring-loaded so as to be restrained from rotation, and further comprising an adjustment mechanism with which the direction of rotation of the output shaft relative to the input shaft can be determined.

By virtue of the above features, there is obtained an automatically switching transmission with as many steps as there are co-operating pairs of gear wheels, and being of relatively short and compact construction, whose cross-sectional dimensions can be kept within values normal for such change gearboxes, by virtue of which the automatic transmission in its totally is relatively light in weight.

As a result of these weight and dimensional features, as well as the possible torque transmission, the automatic transmission is in principle suitable for being incorporated, without undue problems, in any vehicle which hitherto has been provided with a hand-operated change gearbox.

In view of the desired result, i.e., automatic gear changing when the speed of the output shaft is increased, it is preferable for the torque-dependent spring-loaded locking means to be controllable by speed-dependent means, which construction can be kept compact if the torque-dependent spring-loaded locking means consist of rollers and a spring-loaded slide member capable of pushing the rollers into radially extending grooves in a gear wheel, and if the speed-dependent means consist of a spring-loaded, rotatable switching shaft, one end of which can cooperate with a helical groove for rotating the shaft, and the other end with a latch ball for operating the torque-dependent locking means.

Power losses and wear and tear in the operative condition can be minimized in this construction if the speed-dependent clutch can directly couple the input shaft and the output shaft, excluding the controlling section, by directly coupling the input shaft to the drum, which can be realized in a simple manner if the speed-dependent clutch consists of rollers housed in control cages that can be brought into rotation in a peripheral path around the central shaft by the input shaft. This coupling can be broken for purposes of a "kick-down" effect, if spring-loaded thrusting means are provided for at least temporarily releasing the direct coupling between the input shaft and the drum.

Optimum utilization of the available volume and optimum power transmission and force distribution are achieved if the central shaft carries three radial shafts uniformly distributed in circumferential direction, and the forces exerted within the construction can be taken up in a simple but effective manner, if the radial shafts extend between the central shaft and a drum connected with the central shaft.

The requirement of the direction of rotation of the output shaft being reversible, which requirement is inherent in apparatus of the subject kind, can be realized in a simple manner in the automatic transmission according to the present invention, owing to the fact that the adjusting mechanism for changing the driving direction is capable of operatively coupling either the first or the second gear wheels with the output shaft, with the second gear wheels being stationary or rotating around the central shaft, respectively.

Figure 2:
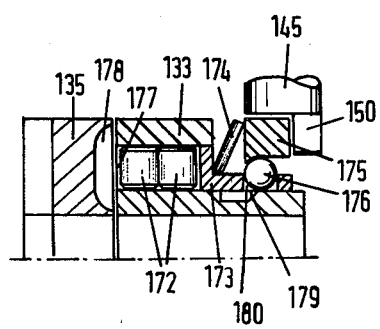

One embodiment of the automatic transmission according to the present invention will now be described and elucidated in more detail, by way of example, with reference to the accompanying drawings, in which FIG. 1 diagrammatically shows a longitudinal sectional view of an automatic transmission according to the present invention; and FIG. 2 illustrates, on an enlarged scale, a detail of the embodiment shown in FIG. 1.

In the embodiment shown in drawing, some details, which are essential for a good operation of the construction, have been omitted as being unnecessary for clarifying the present invention. Among these are means for mounting and locking various parts, while further some parts are shown as one whole, which in practice will be assembled from a plurality of parts in order that these may be mounted. Furthermore, the suspension of the transmission box as a whole will be left out of consideration, and so will a number of—fixed—transmissions for, for example, speed adaptation of the automatic transmission to the motor connected to it.

Referring to the drawings, the automatic transmission shown in FIG. 1 comprises a housing 101, in which extends centrally an input shaft 102. A primary driving member 103, comprising a sleeve 104, a gear wheel 105 and a pump 106 is mounted for rotation on input shaft 102. Gear wheel 105, which is disposed outside housing 101 can be driven by, for example, the fly-wheel of a motor not shown. Pump 106 is capable of driving a turbine 107, fixedly secured to the input shaft 102. Fixedly connected to pump 106 is a coupling ring 108, capable of cooperating with a thrust ring 109, and rollers 110 exerting a pressure thereon as a result of centrifugal forces, there being, for example, six of such rollers, uniformly distributed throughout the circumference of thrust ring 109. Thrust ring 109 is supported by an axial flange 111 of a coupling member 112, which forms part of a drum 113. By means of balls 114, disposed in axial guides in thrust ring 109 and axial flange 11, thrust ring 109 is slidable in axial direction relatively to coupling member 112, but locked from rotation relative to it. Coupling member 112 is further provided with a guide portion 115, which when rollers 110 move radially outwardly as a result of a centrifugal force generated, also causes these rollers to move axially in order that thrust ring 109 may come into contact with coupling ring 108. Guide member 115 has a bore in which is provided a pin 116, one end of which rests on roller 110, and the other end of which is capable of cooperating with a sloping surface of a sliding shoe 117. Mounted on coupling ring 108 so as to be axially slidable is a control ring 118, which by means of connecting pins 119 is coupled to sliding shoes 117. Control ring 118 is urged by a spring 120 in the direction of a thrust bearing 121.

Drum 113 is mounted for rotation on input shaft 102, which at its end located within drum 113 is provided with a gear wheel 122, and via a trunnion 123 is mounted for rotation in a drum shaft 124. Gear wheel 122 cooperates with a gear wheel 125, which is secured to a radial shaft 126 so as to be locked from rotation relative to shaft 126, which shaft is mounted for rotation at one end in drum shaft 124 and at the other end in drum 113. Mounted on radial shaft 126, so as to be locked from rotation relative to it are four further gear wheels 127, 128, 129 and 130. Gear wheel 130 cooperates with a gear wheel 131, rotatable about the central axis of the drum, and journalled, via a free-wheel clutch 132, which permits rotation in one direction only, on a supporting member 133, which via a torque-dependent clutch 134 is connected to a gear wheel 135, which cooperates with gear wheel 129. Supporting member 133 is journalled by means of a free-wheel clutch 136 on a supporting member 137, which via a torque-dependent clutch 138 is connected to a gear wheel 139, which cooperates with gear wheel 128. Supporting member 137 is, in turn, journalled, again via a free-wheel clutch 140, on a supporting member 142 forming part of a hub portion 141, and supporting member 142 is in turn connected through a torque-dependent clutch 143 to a gear wheel 144 capable of cooperating with gear wheel 127. Disposed behind each supporting member 133, 137 and 142 is a control shaft 145, 146 and 147, respectively. Control shaft 145 is slidably received in a drum hub 148, with a compression spring 149 urging control shaft 145 in the direction of supporting member 133. Control shaft 145 is provided at both ends with a cam 150, 151, respectively. Cam 150 is positioned eccentrically on control shaft 145 and engages behind supporting member 133. Cam 151 is also positioned eccentrically on control shaft 145, and can cooperate with a helical groove formed in a control member 152 secured to housing 101. Control shaft 145 ensures a speed-dependent engagement of torque-dependent clutch 134, which will be elucidated hereinafter with reference to FIG. 2. Control shafts 146 and 147 are similarly constructed and have the same function as control shaft 145. For reasons of clarity, a further elaboration of these shafts and their guide means has been omitted.

Hub portion 141 comprises, in addition to supporting member 142, a sleeve 153 and a gear wheel 154. Journalled on sleeve 153 for rotation is drum 113, on which drum, in turn, housing 101 is journalled for rotation. Housing 101 is provided with a hub member 155, mounting a free wheel clutch 156. Free wheel clutch 156 is equipped with a ring gear 157, capable of cooperating with a ring gear 158 on a sleeve 159 forming part of a sliding member 160. Sleeve 159 is further provided with an internal gear 161 arranged to cooperate with gear wheel 154 of hub portion 141. Hub portion 155 is provided with an internal gear 162, which is disposed at the same diameter as gear 157 of free wheel clutch 156. Drum 113 is provided with a gear 163, which is disposed at the same diameter as the teeth of gear wheel 154. Gears 162 and 163 have the same axial disposition as gears 157 and 154, so that sleeve 159 can be coupled with its gears 158 and 161 with housing 101 and drum 113 with their respective gears 162 and 163. Sleeve 159 is journalled by means of balls 164, so as to be rotatable but locked from axial movement, on a ring 165, also forming part of sliding member 160. Ring 165 is provided with an axially extending flange 166 with a gear 167 arranged to cooperate with a gear wheel 168 fixedly secured to drum shaft 124. Gear 167 is at the same diameter as gear 161 of sleeve 159, so that gear 167 is capable of cooperating with gear wheel 154. Ring 165 is journalled, by means of balls 169, so as to be axially movable, but locked from rotation, on an output shaft 170, in which drum shaft 124 is journalled by means of a stud 171.

FIG. 2 shows the torque-dependent clutch 134 of FIG. 1 on an enlarged scale. Torque-dependent clutch 134 comprises a pair of rollers 172, a thrust ring 173, a dish spring 174, a locking ring 175 and a ball 176. Rollers 172 are disposed in a passage 177 in supporting member 133, and can engage in a radially extending V-shaped groove 178 in gear wheel 135. Rollers 172 can be loaded by dish spring 174 through thrust ring 173. Locking ring 175, which cooperates with dish spring 174, can be controlled by cam 150 of control shaft 145. Supporting member 133 has a groove-shaped recess 179, capable of receiving ball 176, situated in a bore 180 in thrust ring 173.

The operation of the apparatus is as follows:

When the primary driving member 103 is rotated, pump 106, which forms part of it, from a given rpm value onwards, will drive turbine 107, which rotates input shaft 102 and hence, through gear 122, rotates gear wheels 125, 127, 128, 129 and 130. Gear wheels 127–130 in turn tend to rotate gear wheels 144, 139, 135 and 131. As, however, gear wheel 144 is in connection through hub portion 141 and sleeve 159 with free-wheel clutch 156, which is mounted so that rotation in the direction concerned is impossible, gear wheel 144 cannot be driven. As gear wheels 131, 135 and 139 are each mounted on hub portion 141 via a free-wheel clutch 132, 136 and 140, which are mounted so that rotation in the direction concerned is impossible, gear wheels 131, 135 and 139, too, cannot be driven. The result is that gear wheels 127, 128, 129 and 130 will start to roll on gear wheels 144, 139, 135 and 131. Owing to this rolling movement, drum 113 and drum shaft 124 will be rotated through radial shaft 126. Through gear wheel 168, gear 167, axial flange 166, ring 165 and balls 169, the output shaft 170 will be set in rotation.

It is observed that drum 113 may comprise three shafts 126 with gear wheels mounted thereon, which shafts 126 are then uniformly distributed throughout its circumference, that is to say, every 120°. Such a symmetrical arrangement is preferred in connection with a uniformly distributed load on shaft 124. For reasons of clarity, in FIG. 1, the presence of one of such shafts 126 with associated gear wheels is taken into account only.

At the output shaft 170 a given torque will be required for the shaft to be set in rotation. This means that it will often be necessary to increase the torque provided by the motor, which is effected by reducing the rpm value by means of the transmission.

If now, first the fastest-rotating transmission is considered, that is to say, the cooperating gear wheels 127 and 144, the torque resulting from this, this being the smallest transmission, will be less than the torque required. If the torque-dependent clutch is in the engaged position, that is to say, the front roller 172 engages in groove 178 and latch ball 176 lies in recess 179, the front roller 172 will be pushed out of groove 178 against the action of dish spring 174, so that gear 144 will start to idle. As regards the torque-dependent clutch 143, it can be observed that the displacement of rollers 172 will move thrust ring 173 and the latter will push latch ball 176 out of recess 179. During this movement locking ring 175 will be displaced as well, which results in a rotation of control shaft 147. The torque-dependent clutch 143 is then in the position shown in FIG. 2.

In the above described manner, the torque-dependent clutches 138 and 134 can be successively disengaged, so that gear wheels 139 and 135 can also rotate freely. Gear wheel 131, which together with gear wheel 130 has the greatest gear ratio, is not provided with a torque-dependent clutch, and therefore cannot be disengaged. At this transmission ratio, therefore, the output shaft 170 should start to rotate.

As a result of the rotation of the drum, the centrifugal forces generated thereby will try to force control shafts 145, 146 and 147 outwardly. When a pre-determined rpm value is reached, the centrifugal force will be so large that the control shaft 145 is forced outwardly against the action of spring 149, during which movement cam 151 will engage with the helical groove of the control member 152, which will result in control shaft 145 being turned back, and hence locking ring 175 will be shifted back against the action of dish spring 174. This displacement also results in a displacement of thrust ring 173 and rollers 172, with front roller 172 engaging with groove 178 during the passage thereof. If permitted by the power to be transmitted, a first automatic change in gear ratio has been effected. Gear wheel 129 will now start to roll on gear wheel 135 and take over the drive of the drum from gear wheels 130 and 131, which will also cause drum 113 to start to rotate faster. This increase in speed (rpm value) of drum 113 can no longer be followed by gear wheel 130, which results in gear wheel 131 being gradually carried along in the same direction of rotation as that of drum 113, which is not prevented by free-wheel clutch 132, which permits rotation in that direction.

At further rpm values, to be pre-determined, gear wheels 128 and 139 and then gear wheels 127 and 144 will provide for the drive of drum 113. If the latter transmission has been realized, and the speed is still further increased, then by means of coupling member 112 a direct connection between input shaft 102 and output shaft 170 will be realized.

This direct connection is brought about by the radially outward deflection of rollers 110, as a result of the centrifugal force exerted thereon, during which movement the rollers are also forced to move axially by guide member 115. Rollers 110 will thereby cause thrust ring 109 to contact coupling ring 108, which is secured to pump 106 of the primary driving member 103. By virtue of this direct connection, the input shaft 102 and the output shaft 170 will rotate at the same speeds. As, via drum 113 and shaft 126, drum shaft 124 will also have the same speed as shafts 102 and 170, the co-operating gears 122-125, 127-124, 128-139, 129-135 and 103-131 will come to stand still. Drum 113 with its entire contents is then rotating at the same speed as the motor.

In case fast acceleration is required of a vehicle in which the apparatus is installed, this can be effected by breaking the direct connection between the input shaft and the output shaft by means of a so-called "kickdown" arrangement. This consists of pin 116, sliding shoe 117, control ring 118, connecting pin 119, spring 120, and thrust bearing 121. Owing to thrust bearing 121 being moved in the direction of control ring 118, whereby the latter is displaced against the action of spring 120, the sloping surface of sliding shoe 117 will start to push against pin 116, whereby this pin is moved downwardly, which means that roller 110 is moved radially inwardly. Owing to this displacement of roller 110, thrust ring 109 will break its contact with coupling ring 108, whereby the direct connection between the input shaft and the output shaft is broken. Turbine 107 will now again provide the drive. The motor will now cause pump 106 to rotate at maximum speed, which speed is transmitted to turbine 107, which in turn, via input shaft 102 will start to drive the various gear wheels. The vehicle will now be capable of fast acceleration in a lower gear ratio.

In order that the output shaft 170 may be caused to rotate in opposite direction to the input shaft 102, sliding member 160 is moved on shaft 170 by means of an operating lever not shown, in such a manner that gears 158, 161 and 167 thereof will start to cooperate with gears 162 and 163 and gear wheel 154, respectively. In this arrangement, drum 113 is locked from rotation by being coupled with housing 101.

The drive of gear wheel 105 of the primary driving member will again, via pump 106, turbine 107, gear wheel 122 and gear wheel 126, cause rotation of gear wheels 127 to 130. As the connection between hub portion 141 and free wheel clutch 156 is now broken, gear wheels 127 to 130 can rotate gear wheels 144, 139, 135 and 131. The torque-dependent clutches 143, 138 and 134 can be disengaged in the same way as described above. Transmission will then be effected through gear wheels 130 and 131, which latter gear wheel will rotate output shaft 170 oppositely to the direction of rotation of the input shaft 102 through free-wheel clutch 132, supporting member 133, free-wheel clutch 136, supporting member 137, hub portion 141 with gear wheel 154, ring 165 with axial flange 166 and gear ring 167, and balls 169.

As drum 113 is now stationary, control shafts 145, 146 and 147 can no longer cause the engagement of the other transmissions.

It will be clear that many modifications and variants can be made without departing from the scope of the invention. Thus for example, the torque-dependent clutch may be made to operate in a different manner, for example, electro-magnetically, while it can then also be made possible that the torque-dependent clutches can be engaged if the output shaft rotates oppositely to the input shaft.

I claim:

1. An automatic transmission comprising a speed-dependent clutch, a section cooperating with said clutch for controlling the transmission ratio between input shaft and output shaft, said section comprising a central shaft carrying at least one radially extending shaft with a plurality of gear wheels mounted on each radial shaft so as to be restrained from rotation relative thereto, said gear wheels being drivable by the input shaft and each having a different pitch circle, said gear wheels being capable, depending on the desired torque-speed ratio, of selectively cooperating with one of a plurality of corresponding gear wheels which include a torque-dependent spring-loaded means operable to restain said corresponding gear wheel from motion relative to said output shaft.

2. An automatic transmission as claimed in claim 1, wherein the torque-dependent spring-loaded means are controllable by said speed-dependent clutch.

3. An automatic transmission as claimed in claim 1 wherein the torque-dependent spring-loaded means comprises rollers and a spring-loaded slide member capable of pushing the rollers into radially extending grooves in a gear wheel.

4. An automatic transmission as claimed in claim 2 wherein the speed-dependent clutch comprises a spring-loaded, rotatable switching shaft, one end of which can cooperate with a helical groove for rotating the shaft, and the other end with a latch ball for operating the torque-dependent spring-loaded means.

5. An automatic transmission as claimed in claim 1, wherein the speed-dependent clutch can directly couple the input shaft and the output shaft by directly coupling the input shaft to the drum.

6. An automatic transmission as claimed in claim 1, wherein the speed-dependent clutch comprises rollers housed in control cages that can be brought into rotation in a peripheral path around the central shaft by the input shaft.

7. An automatic transmission as claimed in claim 5 further including spring-loaded thrusting means are provided for at least temporarily releasing the direct coupling between the input shaft and the drum.

8. An automatic transmission as claimed in claim 1, wherein the central shaft carries three radial shafts uniformly distributed in circumferential direction and each with a set of gear wheels.

9. An automatic transmission as claimed in claim 8, characterized in that the radial shafts extend between the central shaft and a drum connected with the central shaft.

10. An automatic transmission as claimed in 1, further comprising an adjustment mechanism with which the direction of rotation of the output shaft relative to the input shaft can be determined.

11. An automatic transmission as claimed in claim 10, further comprising an adjusting mechanism for changing the driving direction capable of operatively coupling either the first or the second gear wheels with the output shaft, with the second gear wheels being stationary or rotating around the central shaft, respectively.

* * * * *